Patented Dec. 23, 1947

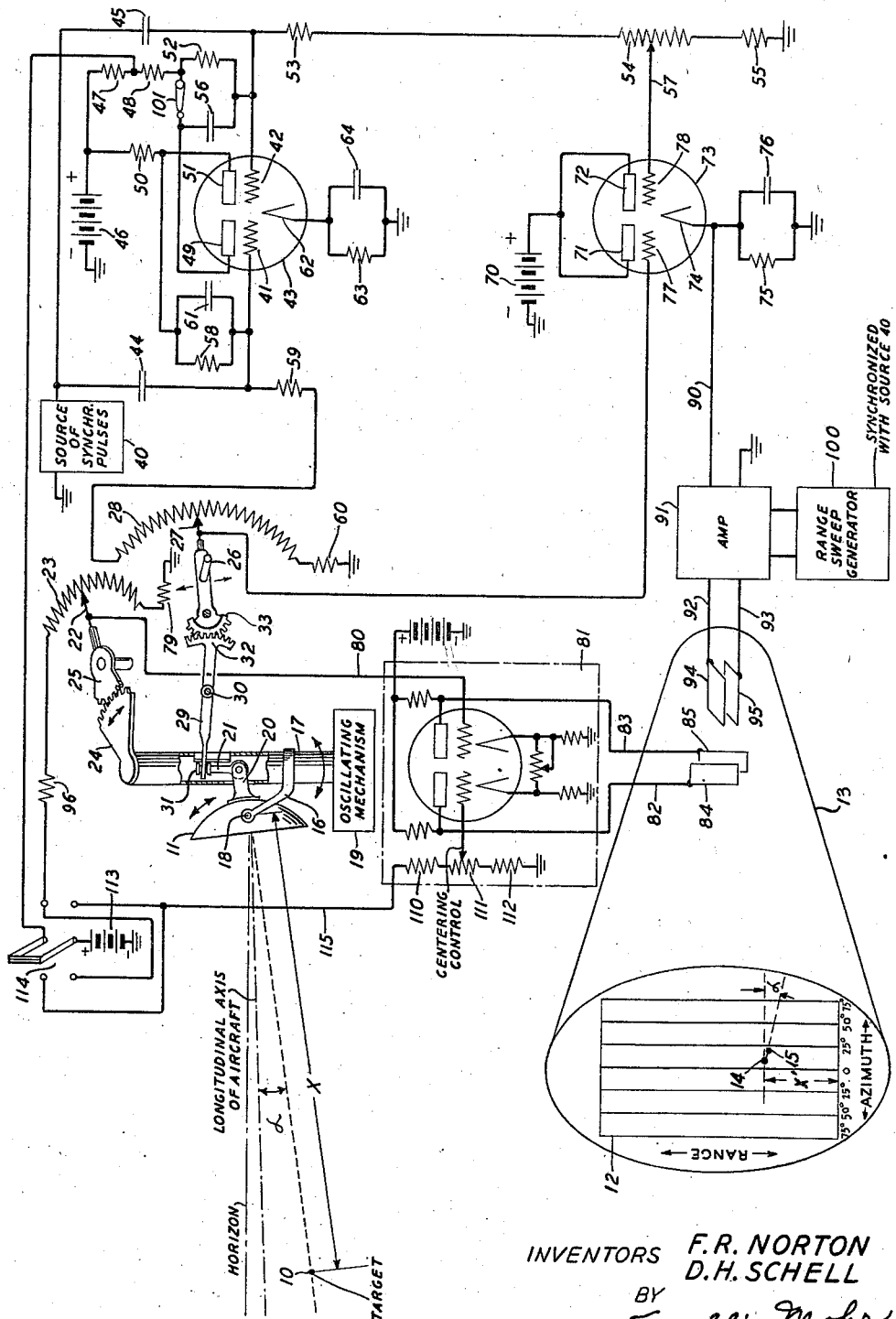

2,433,002

UNITED STATES PATENT OFFICE 2,433,002

PULSE-TYPE POSITION INDICATOR

Frank R. Norton, Chatham, and Donald H. Schell, Morristown, N. J., assignors to Bell Telephone Laboratories, Incorporated, New York, N. Y., a corporation of New York Application September 29, 1944, Serial No. 556,387

5 Claims. (Cl. 250—1.62)

This invention relates to an arrangement for indicating the range, azimuth and elevation of a target and more particularly for displaying such information in a form readily usable by the pilot of an aircraft in discovering and intercepting an enemy aircraft.

It is customary in an object locating system such as a radar to provide for the display of an indication representing a target in the form of a bright spot on a cathode ray oscilloscope or other suitable instrument. The indication is commonly given in terms of the range and azimuth of the target, the quantities being represented by rectangular coordinates on the screen of the indicator. Such a display is known as a Class B indication. It has been proposed to superpose an indication of the elevation of the target upon the usual Class B indication. For such a representation it is desirable to have a second dot, appearing to one side of the dot representing the position of the target, the second dot showing the approximate angle of the target with reference to the longitudinal axis of the aircraft by the distance the second dot is above or below the level of the first dot. The invention provides means for producing such a double-dot indication.

The invention is explained hereinafter with reference to the accompanying drawing, the single figure of which shows a schematic and diagrammatic representation of the invention as embodied in a radar system.

Referring to the drawing, there is illustrated a system intended to be mounted upon an aircraft for detecting and displaying the location of a target as at 10 with respect to a wave projector or antenna 11, the indication being presented upon the screen 12 of a suitable device such as a cathode ray oscilloscope 13. The location of the target is indicated by a pattern comprising two dots 14 and 15 on the screen 12. The range and azimuth of the target are shown by the position of the dot 14 with respect to a coordinate scale appearing upon the screen 12, which may show range in the vertical direction and azimuth in the horizontal direction as indicated in the drawing. The second dot 15 is provided to show in connection with the first dot 14 the relative position of the target with respect to the line of flight of the aircraft. In the interception of enemy aircraft it is desirable to know the range and azimuth of the target and also the tilt angle, herein designated α between a reference plane through the longitudinal axis of the aircraft and the line of projection from the aircraft to the target. The angle α is indicated on the screen 12 by the relative position of the dot 15 above, below or on the level with the dot 14. Specifically, the angle between the horizontal and a line through the two dots may be made equal to the angle α.

The device illustrated is used in a special form of radar. Only so much of the radar system is shown as is deemed necessary for the proper understanding of the invention. The mechanism for measuring the range, and the various other conventional portions of the system may readily be supplied by those familiar with the art. The drawing comprises primarily the arrangements for providing the double-dot presentation on the screen to indicate the tilt angle.

The antenna 11 may be a paraboloidal or dish-shaped reflector mounted upon a pair of brackets 16 attached to a rotatable shaft 17 and hinged as at 18 so that the reflector may be tilted as well as rotated. Suitable means 19 may be provided for oscillating or rotating the shaft 17 so that the exploratory beam projected by the antenna may be made to scan a desired portion of the horizon in search of a target. An arm 20 may be rigidly attached to the back of the projector 11 for use in tilting the projector. The shaft 17 may be apertured in a suitable manner so that the arm 20 may extend to the central axis of the shaft 17 and may there be connected to a pivoted tilt rod 21 which rod may work in the axial direction with respect to the shaft 17 to change the tilt angle of the projector.

The shaft 17 may be geared to the movable contact 22 of a potentiometer 23 in any suitable manner as by means of a pair of toothed segmental gears 24 and 25. The tilt rod 21 may be geared to a handle 26 and to the movable contact 27 of a potentiometer 28 by any suitable means. For example, a tilt arm 29, movable about a pivot 30 may be rotatably secured to the rod 21 as by a pin 31 so that the tilt arm may operate to raise or lower the rod 21 independently of the oscillation of the shaft 17. On the opposite side of the pivot 30, the tilt arm 29 may be extended to form a toothed segmental gear 32 meshing with another such gear 33 attached to the handle 26 and to the movable contact 27.

While searching for or observing a target, the projector 11 may be oscillated to execute an azimuthal motion by means of the mechanism 19, which motion is transmitted to the movable contact 22 to provide a sweep potential whereby the position of the cathode ray with respect to the screen 12 may be coordinated with the bearing of the antenna 11. It will be understood that when a target is struck by the exploratory beam from the antenna, a dot, such as the dot 14, will be caused to appear upon the screen 12 in known manner as by intensifying the electron beam or cathode ray momentarily at the proper instant to indicate the range X of the target by the vertical position of the spot on the screen. The dot 14 will appear at the proper horizontal position with respect to the azimuth scale to correspond to the bearing of the target. While searching also, the handle 26 may be operated, either manually or by suitable mechanism to alter the tilt angle until a target is discovered. The tilt angle may then be adjusted by means of the handle 26 to obtain a maximum intensity of the dot 14, thereby indicating that the projector 11 is tilted so as to throw the center of the beam directly toward the target. The amount of tilt required is translated into an electrical indication by means of the potentiometer 28.

The position of dot 14 on the screen 12 is determined by the voltages applied to the four deflection plates 84, 85, 94 and 95 of tube 13. By changing the horizontal deflection voltages, all other conditions remaining fixed, the azimuth position of the dot is changed by a desired azimuth increment. A vertical increment may also be added, thus changing the position of the dot both in the vertical plane and in azimuth. The displaced dot now becomes dot 15. By electronically switching between these conditions of dot 14 and dot 15 so that even alternate pulses show dot 14 and odd alternate pulses show dot 15, the information presented by dot 14 may be used for range and azimuth information and the relative position of dot 15 with respect to dot 14 may be used to present elevation information.

The electrical circuits for producing and regulating the position of the second dot 15 are shown principally in the right-hand portion of the drawing. A source 40 of synchronizing pulses such as is a conventional part of the usual radar system is shown coupled to the grids 41 and 42 of a double triode 43 by means of coupling condensers 44 and 45, respectively. A source 46 of steady electromotive force, the negative terminal of which may be grounded, has its positive terminal connected through two anode circuit resistors 47 and 48 to the anode 49 of the tube 43, which anode is paired with the grid 41. The source 46 has its positive terminal also connected through an anode circuit resistor 50 to the anode 51, paired with the grid 42 of the tube 43. A potential divider comprising a series of resistors 52, 53, 54 and 55 is connected between the anode 49 and ground, the opposite grid 42 being connected with a point between the resistors 52 and 53. A condenser 56 may be connected in parallel with the resistor 52 and the resistor 54 may be in the form of a potentiometer having a movable contact 57. Between the anode 51 and ground, there is connected a potential divider comprising a resistor 58, a resistor 59, the potentiometer 28 and a resistor 60. A condenser 61 may be connected in parallel with the resistor 58. The cathode 62, common to both sides of the tube 43, may be connected to ground through the parallel combination of a resistor 63 and a condenser 64. A source 70 of steady electromotive force, which may if desired be one with the source 46, has its negative terminal grounded and its positive terminal connected to the anodes 71 and 72 of a double triode 73, the common cathode 74 of which may be connected to ground through the parallel combination of a resistor 75 and a condenser 76. The grid 77, paired with the anode 71, is connected to the movable contact 27 of potentiometer 28. The grid 78, paired with the anode 72, is connected with the movable contact 57 of the potentiometer 54.

The potentiometer 23 is connected between resistors 79 and 96, 79 connecting to ground and 96 joining to the common point of resistors 47 and 48 through a reversing switch 114 when the latter is thrown to the right-hand position. The movable contact 22 of potentiometer 23 is connected through a lead 80 to the input of an amplifier 81 which preferably converts a single phase input to a push-pull output and may be of the cathode coupled type. The output leads 82 and 83 of the amplifier 81 are connected respectively to the plates 84 and 85 of the oscilloscope 13 which plates control the horizontal deflection of the electron beam of the oscilloscope.

An alternative feed for the horizontal deflection increment, in some cases preferable, is effected by connecting one end of a resistor 110 to the common terminal of resistors 47 and 48 and resistor 96 to a potential source such as a battery 113, as may be done by means of the reversing switch 114. When the switch 114 is thrown to the right-hand position, the azimuth increment varies somewhat with the bearing of the antenna but the lead 115 is not required to be in the control circuit. When the switch 114 is in the left-hand position, the azimuth increment is independent of the bearing but the lead 115 becomes an additional control lead which may be a detriment in some applications of the invention. The resistor 110 together with a potentiometer 111 and a resistor 112 constitute a voltage divider, the potentiometer 111 serving as a centering control for the horizontal positioning of the electron beam. It will be evident that it is not necessary to feed the current from the junction point of the resistors through the azimuth potentiometer 23 as in the left-hand position of the switch 114, since this current may be fed through the potentiometer 11 as in the left-hand position of the switch. The function of the aforesaid current is primarily to provide the desired azimuth increment regardless of the bearing of the antenna.

The cathode 74 of the tube 73 is connected through a lead 90 to the input of an amplifier 91 which like the amplifier 81, preferably converts a single phase input to a push-pull output. The output leads 92 and 93 are connected respectively to the plates 94 and 95 which control the vertical deflection of the electron beam in the oscilloscope 13. The usual range sweep generator 100 may be connected also to the input of the amplifier 91 to provide the ordinary vertical control of the electron beam.

A switch 101 may be provided for normally connecting the common point between the resistors 48 and 52 with the anode 49 and the uppermost terminal of the condenser 56 as shown in the drawing. The switch 101 may be opened when the double-dot representation is not desired, in which case the dot 14 will appear upon the screen unaccompanied by a corresponding dot 15.

In the operation of the double-dot circuit, the switch 101 being closed, the tube 43 and associated circuit have two stable modes of operation electrically interlocked. Each of the modes of operation produces three voltage outputs. The output voltages from one mode are used to control the screen position of the sweep traces for one of the dots; the output voltages from the other mode are used to control the sweep traces of the other dot. The double-dot circuit may be alternately switched at any convenient rate, such as one thousand times a second from one mode of operation to the other by means of a triggering action of the tube 43 synchronized with the range sweep. It is usual to control the range sweep by means of a sequence of starting and stopping pulses and either the starting or the stopping pulse may be employed to energize the switching system of the double-dash dot circuit. It is usually preferable to employ for this purpose the stop pulse as in this case the circuit has time to become stable before the beginning of the succeeding sweep.

One of the output voltages of the tube 43, appearing at the junction of the resistors 47 and 48, is supplied to the azimuth amplifier 81. The two modes of operation of the tube 43 produce slightly different voltages on the input grid of the amplifier 81. Alternate traces are by this means displaced horizontally on the screen 12, thereby causing the dot 15 to appear slightly to one side of the dot 14. Due to the movement of the contact 22 in accordance with the azimuth bearing the output voltage from the potentiometer 23 provides a variable voltage which is amplified in the amplifier 81 and applied to the control of the horizontal position of the sweep traces.

The vertical positioning or centering of the sweep traces is controlled by the voltage output appearing at the cathode 74 of the tube 73. This tube acts as a dual controlled cathode follower, the grids of which are supplied by the second and third voltage outputs hereinbefore mentioned for the tube 43. The rectangular wave shapes of the voltages applied to the grids 77 and 78 of the tube 73 are 180 degrees out of phase and are obtained from the respective anodes 49 and 51 of the tube 43. The grid voltages applied to tube 73 are such that first one grid voltage and then the other controls the cathode potential. Hence, the control of the sweep traces switches alternately from one grid to the other in step with the triggering of tube 43. The voltage from the anode 49 is impressed upon the tilt potentiometer 28 on the projector. When this voltage is in control, the vertical position of the dot 15 depends upon the voltage resulting from the tilt of the reflector. The control period of this vertical centering voltage is coincident with the voltage which controls the horizontal position of the elevation trace, that is, the trace which produces the dot 15. The voltage from the anode 51 is impressed upon the potentiometer 54. When this voltage is in control the position of the range-azimuth trace, that is, the trace which produces the dot 14, is controlled only by the setting of the potentiometer 54 which is normally left unchanged during operation, and no vertical displacement occurs. As a result the dot 14 appears at the correct range-azimuth point on the screen 12 and the dot 15 is displaced horizontally a slight distance from the dot 14 and vertically by an amount depending on the tilt of the projector.

In greater detail, the operation of the double-dot circuit is as follows: Both stages of the tube 43 are supplied with a positive potential upon the grid by way of the respective voltage dividers. The presence of an anode current in one stage results in a sufficient bias in the cathode resistor 63 to reduce the grid of the other stage below cut off in spite of the positive potential supplied by the voltage divider. At any particular instant, then, one side of the tube 43 will be conductive and the other side non-conductive, depending upon the previous history of the circuit. It will be assumed for the purpose of the present description, that initially the second stage of the tube 43 is conducting and the first stage is non-conducting. If a negative pulse is then supplied by the source 40, the second stage of the tube 43 is driven below cut off and becomes non-conducting. The anode potential of the second stage, which was originally very low due to the conduction of current through the second stage, is sharply increased when the tube becomes non-conducting. The resulting increase in anode potential is transferred to the grid 41 where it overcomes the effect of the simultaneous incoming negative potential on that grid from the source 40. The first stage, therefore, becomes conducting and the potential on the anode 49 falls abruptly. This drop in potential is transferred to the grid 42 through the voltage divider consisting of the resistors 52, 53, 55 and the potentiometer 54, and holds the second stage non-conducting. When a following negative pulse is supplied from the source 40, it is the first stage of the tube 43 that is driven below cut off and becomes non-conducting. The potential of the plate 49 rises abruptly and the increase is transferred to the grid 42. This makes the second stage conducting, which drops the potential on anode 51 and consequently on grid 41. In this way, successive pulses from source 40 cause the tube 43 to alternate between the two modes.

The output of the anode 49 supplies a two-level voltage having a rate of oscillation equal to one half the pulse rate. Since the position of the variable contactor 22 of the potentiometer 23 is a function of the azimuth bearing of the reflector 11, the input of the amplifier 81 associated with the horizontal deflection facilities of the oscilloscope receives two kinds of voltage increments: first, a slowly varying voltage which is a function of the bearing of the reflector and second, a two-level voltage change, the purpose of which is to displace each alternate pulse on the screen 12 a slight distance to one side of its predecessor, thereby providing for the horizontal displacement of the dot 15 with respect to the dot 14.

The two remaining output voltages, appearing at the anodes 49 and 51, are impressed respectively upon the potentiometers 28 and 54. Each of these output voltages alternates between two voltage values, one voltage being high while the other is low and vice versa. The proper relation between the magnitudes of these voltages may be obtained by setting the reflector 11 at a zero angle of tilt and adjusting the contact 57 on the potentiometer 54 so as to obtain the same total current to the cathode resistor 75 during the two modes of operation of the tube 43. During one mode of operation one stage of the tube 73 will supply most of the current while the other stage will be close to cut off. During the following period the reverse will be true.

If now, the antenna tilt is changed, as by operating the handle 26, the circuit will function so that the total current in the resistor 75 changes during alternate periods of the operation of the tube 43. For example, for positive angles of tilt, that is, for the reflector 11 pointing above the longitudinal axis of the aircraft, the circuit may be made to function so that the dot 15 is displaced upward compared to its companion dot 14 and for negative or downward tilt angles, the dot 15 is displaced downward compared with the dot 14.

The tube 73, as above mentioned, is alternately activated first by one grid and then by the other. In either case the resultant anode current flows through the cathode resistor 75.

For search purposes, or whenever the second dot is not desired, the switch 101 may be opened thereby disabling the first stage of the tube 43 continuously. As a result there are no pulsed potentials on the potentiometers 23 (or 111), 28 and 54, except for the effect of the negative pulses supplied by the source 49, the latter pulses come at the end of the range sweep and consequently are of no practical importance. As thus operated there is no horizontal or vertical displacement of the sweeps and only the dot 14 is observed on the screen.

While the description of the operation of the system has been given in terms of three output voltages, each of which may assume either of two values alternately, there are essentially but two voltage variations or voltage control waves employed. These appear, respectively, at the junction of the resistors 47 and 48 and at the cathode 74 of the tube 73. The voltage variations at the junction of the resistors 47 and 48 determine the amount of horizontal displacement of the dot 15 with respect to the dot 14 while the voltage variations at the cathode of the tube 73 determine the amount and direction of vertical displacement. The voltage outputs hereinbefore referred to as being applied respectively to the tilt potentiometer 28 and to the reference potentiometer 54 combine through the instrumentality of the tube 73 to produce the voltage control wave on the cathode 74. It will be evident that the two essential voltage control waves may be generated in ways other than that illustrated herein.

The amplitude of the voltage control wave on the cathode 74 determines the amount of the vertical displacement of the dot 15 with respect to the dot 14 and the phase of the wave determines the direction of the displacement.

In the use of the system for searching and intercepting enemy aircraft, the operator of the aircraft may open the switch 101 while searching for a target in order to avoid the confusion of a double-dot presentation when a target is found. When a dot such as dot 14 appears on the screen 12, the operator may observe the range and azimuth of the target with reference to the marks on the screen. Turning his aircraft about until the target appears dead ahead as evidenced by dot 14 moving to the vertical center line, he may then close the switch 101, thereby causing the second dot 15 to appear and give him information as to whether the target is above, below, or on level with the longitudinal axis of his craft. He may then tilt his plane so as to proceed upwardly, downwardly, or on the level as may be necessary to intercept the target. The operator will know when he is heading directly toward the target, for in that case the dot 14 will appear at zero azimuth and the dot 15 will be on a level with the dot 14.

Or, when a target is discovered by the operator, he may determine its elevation angle with respect to the longitudinal axis of his craft without altering his own course, simply by closing switch 101 and noting the elevation of the second dot which appears displaced in azimuth, with respect to the particular target.

What is claimed is:

1. A scanning antenna having an azimuthal motion and an elevational motion, each with reference to a coordinate system that is movable with reference to a given target, an azimuth potentiometer which is geared to follow the azimuthal motion of the antenna with respect to the said coordinate system, thereby producing an output potential proportioned to its impressed input potential in variable proportion dependent upon the instantaneous azimuthal angle of the antenna, an elevation potentiometer which is geared to follow the elevational motion of the antenna with respect to the said coordinate system, thereby producing an output proportioned to its impressed input potential in variable proportion dependent upon the instantaneous elevational angle of the antenna, a reference potentiometer producing an output potential in predetermined proportion to its impressed input potential, a source of recurrent impulses, switching means actuated by successive impulses from said source, said switching means comprising means alternating the impressed input potential of the azimuth potentiometer between two fixed values, for the purpose of producing paired indications, said switching means further comprising means simultaneously alternating the impressed input potentials of the elevation potentiometer and of the reference potentiometer respectively to impress in one alternation a high potential upon the one potentiometer and a low potential upon the other and in the next alternation to interchange the higher and lower potentials, and means selective to the amplitude of the output potential and responding alternately to the elevation potentiometer and to the reference potentiometer, for producing a difference between said paired indications representing the elevational angle of the target.

2. An indicating system comprising a triggering circuit having two stable conditions, a source of recurrent impulses causing said triggering circuit to assume alternately the said stable conditions, said triggering circuit having three output terminals, the first of which alternates in potential between two values, the second and third of which alternate between a high potential and a low potential in opposing phase, three potentiometers energized respectively by the potentials of said first, second and third output terminals, and a double-grid cathode follower, the respective grids of which are connected to the second and third output terminals.

3. An indicating system comprising a triggering circuit having two stable conditions and an intermediate unstable condition, a source of recurrent impulses causing said triggering circuit to alternate between the said stable conditions, said triggering circuit having three outputs, the first of which alternates in voltage between two values differing by a relatively small fixed amount, the second and third of which outputs alternate in voltage between a high value and a low value in opposing phase, a first potentiometer energized by said first output, a sweep circuit energized by the potential of a movable contact on said first potentiometer, second and third potentiometers energized respectively by the said second and third outputs, another sweep circuit, means energized alternately by the high voltage condition of a movable contact on said second potentiometer and by the high voltage condition of a predetermined intermediate point on said third potentiometer to produce a voltage increment in said second-mentioned sweep circuit.

4. An indicator comprising a source of steady electromotive force, a pair of branched circuits parallel connected with said source, space discharge means in each of said parallel circuits for abruptly changing the potentials of the intermediate points in each circuit, electrical interlocking means interconnecting said respective space discharge means in opposing phase so that when the potential of an intermediate point in one parallel circuit is increased the potential of an intermediate point in the other parallel circuit is decreased, means causing said space discharge means to alternate between two states, a first potentiometer energized by the potential at a first intermediate point in one of said parallel circuits, a second potentiometer energized by the potential at a second intermediate point in one of said parallel circuits, a reference circuit energized by the potential at a third intermediate point located in the opposite parallel circuit from said second intermediate point, a space discharge system having a common cathode, two anodes, and two grids paired with the respective anodes, said system constituting a double-grid cathode follower, means connecting a point in said second potentiometer to one grid of said cathode follower, means connecting a point in said reference circuit to the other grid of said cathode follower, each said point of connection being characterized by a potential in one state of the system sufficiently low to be substantially ineffective to operate the said cathode follower and by a potential in the other state sufficiently high to substantially control the response of the cathode follower.

5. A scanning antenna having an azimuthal motion and an elevational motion, an azimuth potentiometer geared to follow said azimuthal motion, an elevation potentiometer geared to follow said elevational motion, a reference potentiometer, a triggering circuit having two stable conditions, a source of recurrent impulses causing said triggering circuit to alternate between said stable conditions, said triggering circuit having three outputs, the first of which alternates in voltage between two values differing by a relatively small fixed amount, the second and third of which outputs alternate in voltage between a high value and a low value in opposing phases of alternation, said azimuth potentiometer being connected across said first output, an azimuth sweep circuit energized by the variable potential produced in said azimuth potentiometer in accordance with the azimuthal motion of the antenna superposed upon the said alternations impressed by said triggering circuit, said elevation potentiometer and said reference potentiometer being connected across said second and third outputs respectively, a second sweep circuit, and means energized alternately by the variable potential produced in said elevation potentiometer in accordance with the elevational motion of the antenna and by the potential of a predetermined intermediate point on said reference potentiometer to produce a voltage increment superposed upon the normal voltage variation of said second sweep circuit, said last-mentioned means being selectively activated in the high voltage condition of the second and third outputs.

FRANK R. NORTON.
DONALD H. SCHELL.

REFERENCES CITED

The following references are of record in the file of this patent:

UNITED STATES PATENTS

| Number | Name | Date |
|---|---|---|
| 2,089,430 | Roys et al. | Aug. 10, 1937 |